March 15, 1966 W. SCHMIDT ETAL 3,240,590
METALLURGICAL SYSTEM
Filed Aug. 17, 1962 3 Sheets-Sheet 1

INVENTORS
WALTHER SCHMIDT
JOHN W. CARSON

BY Glenn, Palmer & Matthews
ATTORNEYS

March 15, 1966  W. SCHMIDT ETAL  3,240,590
METALLURGICAL SYSTEM
Filed Aug. 17, 1962  3 Sheets-Sheet 2
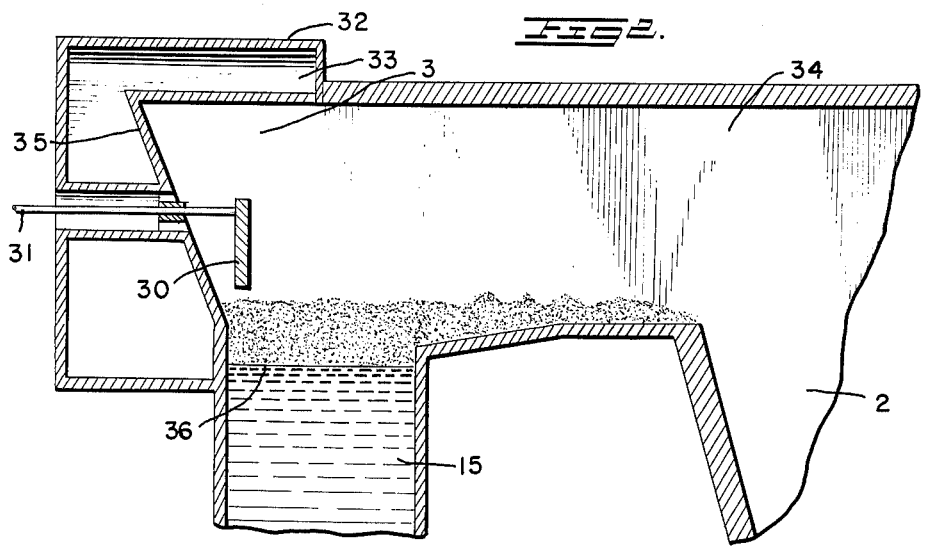
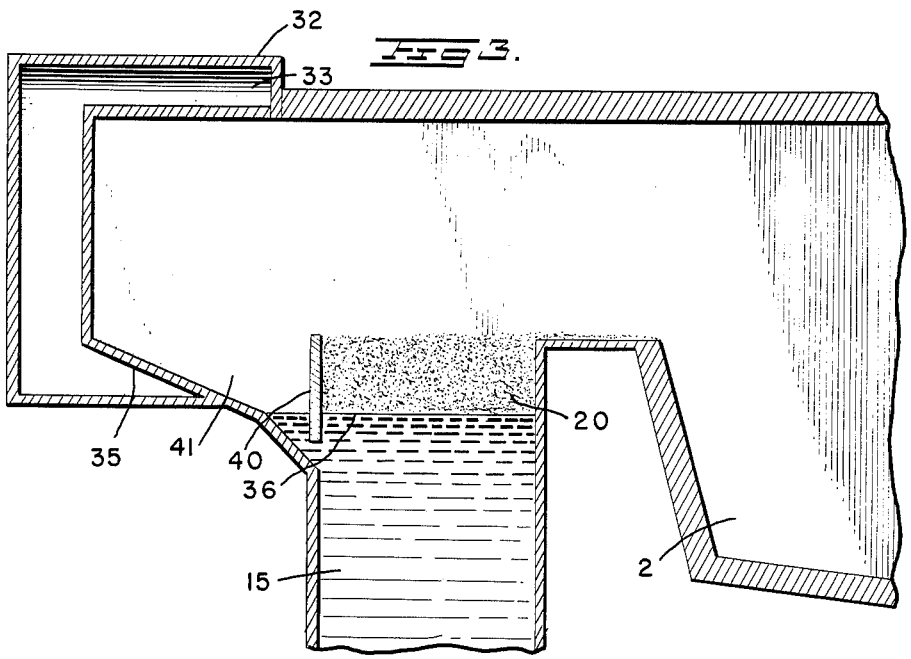
INVENTORS
WALTHER SCHMIDT
JOHN W. CARSON
BY *Glenn, Palmer & Matthews*
ATTORNEYS March 15, 1966  W. SCHMIDT ETAL  3,240,590
METALLURGICAL SYSTEM
Filed Aug. 17, 1962  3 Sheets-Sheet 3
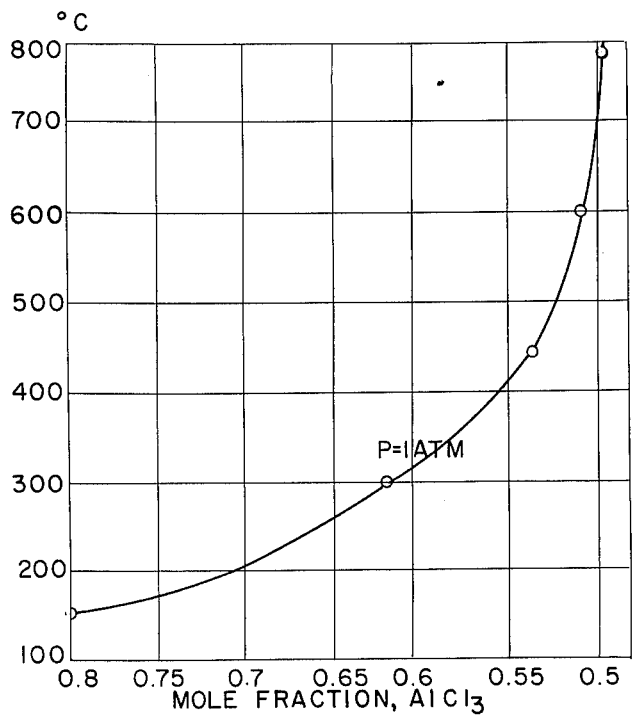
SYSTEM $AlCl_3$-NaCl: ISOBAR FOR TOTAL PRESSURE OF 1 ATMOSPHERE
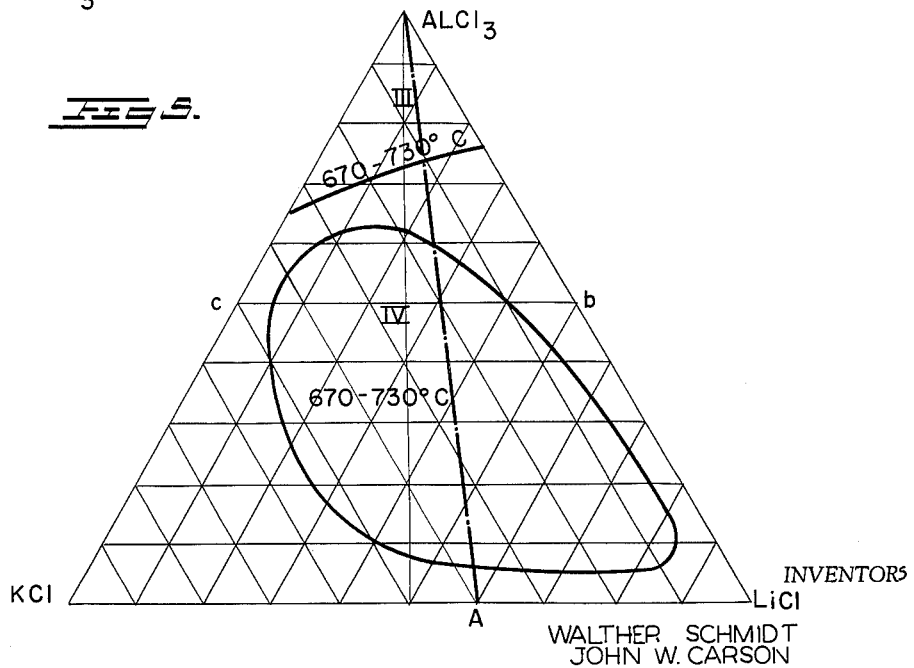
INVENTORS
WALTHER SCHMIDT
JOHN W. CARSON
BY Glenn, Palmer & Matthews
ATTORNEYS United States Patent Office 3,240,590
Patented Mar. 15, 1966

3,240,590
METALLURGICAL SYSTEM
Walther Schmidt, Henrico County, and John W. Carson, Chesterfield County, Va., assignors to Reynolds Metals Company, Richmond, Va., a corporation of Delaware
Filed Aug. 17, 1962, Ser. No. 217,678
19 Claims. (Cl. 75—63)

This invention relates to an improved process and apparatus for the melting and purification of mercury-containing aluminum. More particularly the invention concerns a novel process for the separation and recovery of mercury from aluminum-mercury mixtures by melting of the aluminum and distillation of the mercury therefrom in a system employing a molten salt bath.

It has been proposed in the prior art to extract aluminum from materials in which it is available in metallic form by employing hot liquid extracting metals such as mercury or zinc. Thus, for example, by employing mercury at an elevated temperature between about 500° C. and about 650° C. under superatmospheric pressure, aluminum can be separated from iron, silicon, titanium, and like impurities, which are not dissolved by the mercury. The solution of aluminum in mercury is separated and allowed to crystallize, preferably at a temperature at which the growth of aluminum crystals is sufficiently rapid to yield relatively coarse crystals of aluminum within a reasonable time. Thus, by permitting a crystallization of 20 to 30 minutes at a temperature between about 250° and 300° C., the aluminum crystals formed will grow to a size sufficiently large to separate from the body of the mercury and to float on top of the mercury by virtue of their buoyancy, forming a layer having a dry appearance. However, despite their appearance, the aluminum crystals nevertheless contain a substantial amount of mercury, either as occlusions or in the form of a solid solution with the aluminum. In most instances, aluminum crystals produced as described will contain from about 30% to 50% of mercury by weight.

The separation of the contained mercury from the aluminum crystals presents many problems, and prior to the present invention, no process has been known by which this could be accomplished expeditiously and economically. Mechanical separation methods are known, whereby a portion of the contained mercury is squeezed out under pressure, for example, by passing the aluminum crystals through a pair of rolls, or by extrusion through an orifice allowing clearance for the outflow of liquid mercury. In pressure separations, the pressures employed must be quite high in order to bring about any significant reduction of mercury content. Thus, compacting the crystals under a pressure of 1 ton per sq. cm. will reduce the mercury content from about 40% to about 20% by weight. Thus, a relatively large residual content of mercury must be removed as vapor when the aluminum is subsequently melted. Inasmuch as some of the mercury is in solid solution in the aluminum, some of the mercury tends to be retained until a temperature is reached at which the solid solution itself becomes molten.

It is also known to separate the mercury from the aluminum by melting the crystals and distilling off the mercury. This operation presents several difficulties, particularly as regards commercial performance in which the melting and distillation must be completed within a practical short period of time. One of these difficulties is that aluminum in finely divided form is entrained along with the mercury vapor and accumulates in and clogs the condensing system. In practice it has been observed that as much as 10% to 20% of the charged aluminum becomes entrained in the condensation system, requiring frequent interruptions and shutdowns for cleaning. Since the finely divided aluminum oxidizes very rapidly under these conditions, the operation entails a considerable loss of metal. Moreover, the operation hazards are increased in view of the toxicity of the mercury.

Known types of equipment for conducting melting and distillation of the aluminum-mercury mixture in a closed system present further difficulties in providing efficient means for supplying heat thereto. In order to achieve aluminum of high purity, particularly where superpure aluminum, 99.99% Al is desired, the molten aluminum cannot be permitted to be in contact with a contaminating metal container. It is, therefore, not practical to supply heat to the system other than by means of internal sources. Since mercury losses may be avoided, the equipment must be enclosed within a tight metallic shell, such as welded steel, which precludes the application of high frequency induction heating. Efforts to utilize resistance heaters inside the melting chamber will also be unsuccessful, because there are no resistor materials available which will not in time react with the aluminum at the operating temperatures. The aluminum will contact the resistors either by splashing or by entrainment in finely divided form in the mercury vapor.

In accordance with the present invention there are provided a novel process and apparatus for the melting of mercury-containing aluminum and for the distillation and recovery of the mercury, which represent a marked improvement in this field.

The invention has for its principal object the separation and recovery of contained mercury from aluminum obtained by mercury extraction of aluminum metal containing material.

A further object of the invention is the provision of a novel process for separation of contained mercury from the aluminum under moderate conditions and in an economical manner.

A further object of the invention is the provision of a novel apparatus including a closed melting and distillation system wherein molten salt bath aids in the continuous separation and recovery of mercury, aluminum entrained in the mercury vapor, and of pure aluminum itself.

These and other objects will become apparent as the description proceeds, and are accomplished by the invention as set forth in the specification and the accompanying drawings, in which:

FIG. 2 is a sectional elevation showing a modification of the feeding and condensing means of FIG. 1.

FIG. 3 is a sectional elevation showing a further modification of the feeding and condensing means of FIG. 1, FIG. 4 is a curve showing vapor pressure of molar mixtures of $AlCl_3$ and $NaCl$ at various temperatures.

FIG. 5 is a phase diagram of the system

Figure 1:
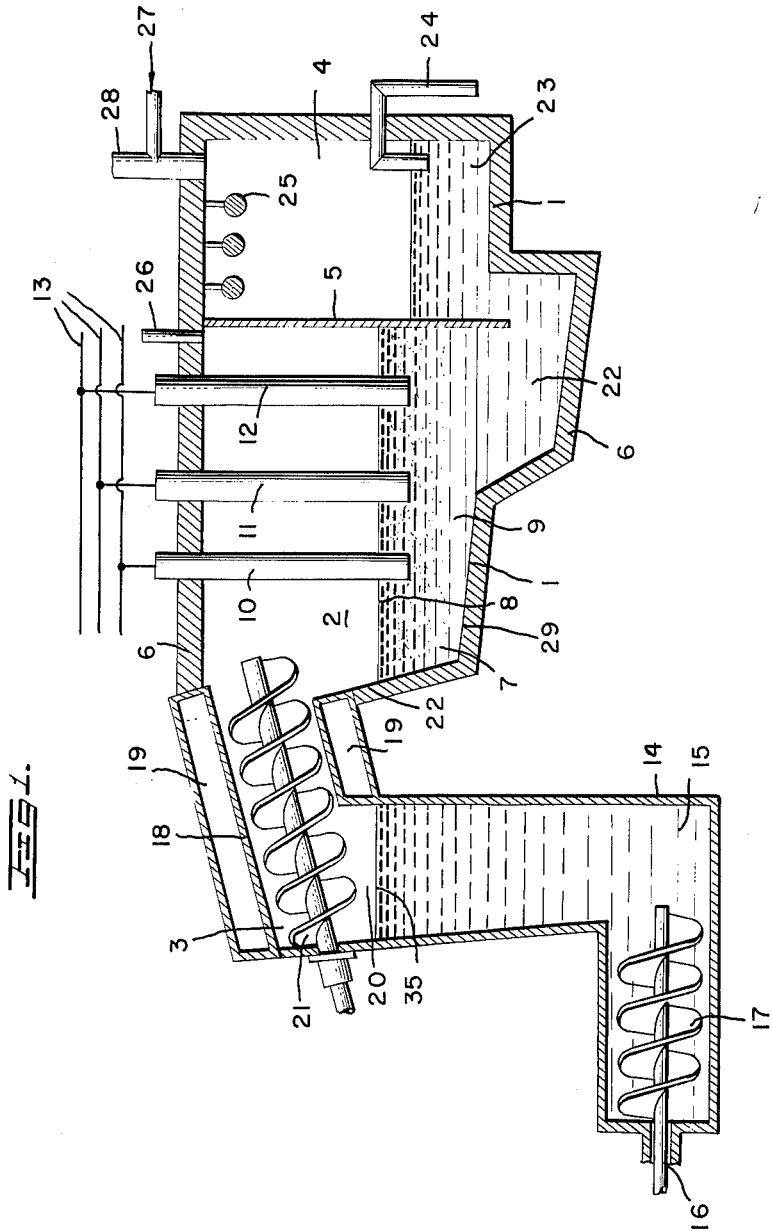
FIG. 1 is a sectional elevation of one form of an apparatus for carrying out the process of the invention.

The starting material for carrying out the process of the invention is a mixture of aluminum crystals and mercury such as is obtainable by the liquid mercury extraction of an aluminum metal containing material at elevated temperature, as explained previously. The aluminum crystals will ordinarily contain from about 40% to about 45% mercury by weight, in occluded form. In addition, there may be present in the aluminum crystals, a solid solution of mercury in aluminum, comprising about 6% mercury by weight. Such mercury-containing aluminum crystals may be obtained, for example, by extraction of aluminum metal from alloys of aluminum and silicon of the type obtainable by the carbothermic reduction of bauxite or aluminous clays with carbon (coke). Such alloys will generally contain from about 40% to about 75% of aluminum, the balance being silicon, with small amounts of iron and titanium.

In accordance with the invention, mercury-containing aluminum is treated to recover mercury and aluminum therefrom by a process of melting and mercury vaporization which comprises introducing mercury-containing aluminum into a molten salt bath maintained at a temperature above the melting point of aluminum, to cause melting of the aluminum and vaporization of the mercury, the bath having a melting temperature range providing a substantial amount of liquid phase at a temperature below the temperature of condensation of mercury vapor under the prevailing pressure, said mercury vapor containing entrained particles of finely divided aluminum and of salt bath ingredients, cooling and condensing the mercury vapor, separating the liquid mercury from the entrained particles, and returning said aluminum and salt particles to the molten salt bath.

The process of the invention is adapted to continuous operation, with continuous recovery of mercury content of the aluminum, continuous recovery of finely divided aluminum which passes into the mercury condensing system, and recovery and recycling of the ingredients of the molten salt bath which have been entrained in the mercury vapor back to the salt bath itself.

The unique process of the invention not only overcomes the drawback of entrainment of aluminum particles in the mercury vapors previously described, but turns it to advantage by providing in addition to the entrained aluminum particles, particles of the ingredients of the molten bath, entrained also in the mercury vapor stream. The salt particles are so composed, in accordance with the invention, that they remain liquid or become liquid at a temperature below the condensation temperature of mercury, thereby forming a pasty mixture of entrained finely divided aluminum and salt, which is easily removable from the condenser surfaces by mechanical means, and thus readily returnable to the body of the molten salt bath. The salt particles prevent agglomeration of the aluminum, and further prevent adhesion of the aluminum to the condenser surfaces in any except readily removable form. In effect, a reflux of entrained molten salt or salt mixture is maintained, the amount of salt being substantially larger than the amount of entrained aluminum, thus readily permitting flushing of the aluminum and the salt back into the mercury distillation equipment.

In accordance with an alternate embodiment of the process of the invention, the feed of the original mixture of aluminum and mercury to be melted and distilled is introduced into the refluxing stream and transported to the distillation step by the force of the refluxing stream of the returning aluminum and salt particles.

When the aluminum-mercury mixture is introduced into the molten salt bath, the mercury vaporizes almost immediately. Any solid solution of mercury present in the aluminum crystals is separated upon melting.

The process of the invention may be carried out at subatmospheric, atmospheric or superatmospheric pressure, but in general, it is preferable to operate at about 1.1 atmospheres absolute pressure within the system.

For separating and vaporizing the mercury from the aluminum-mercury mixture, the invention employs a molten salt bath having an average temperature above the melting point of aluminum (660° C.), advantageously about 700° C. When the mercury-containing aluminum crystals are introduced into the molten salt bath, the aluminum melts and collects in a pool at the bottom of the molten salt bath. By reason of its boiling point of 356.6° C., the mercury vaporizes quickly, the vapors of mercury entraining particles of aluminum and particles of liquid salt bath ingredients.

The molten salt bath must have a melting temperature range providing a substantial amount of liquid phase at a temperature below the temperature of condensation of mercury at the prevailing pressure (356.6° C. at 1 atmosphere pressure), i.e. a substantial proportion of the salts comprising the bath must remain liquid at this temperature. The term "melting temperature range" is defined as including not only the fairly precise melting point which is characteristic of a pure substance, but also the range of melting temperature which may occur in an impure substance or a mixture of substances, e.g., in systems which have a temperature interval between solidus and liquidus.

The molten salt bath also serves to furnish salt vapors and entrained liquid salt particles to the mercury vapor stream so that the salt condensed therefrom during the condensation of the mercury can also serve to flush out and return to the distillation system any entrained particles of aluminum. The aluminum together with the liquid salt mixture returns to the body of the molten salt bath and the aluminum is separated therein and passes to the aluminum metal pool under the salt bath. Thus the condensation step involves also the recovery not only of entrained salt particles, but of salts condensed from their vapors. The salt mixes with the aluminum on the condenser surfaces. If a relatively small amount of salt is employed, e.g. equal parts of entrained aluminum and salt, a pasty mixture results, which can easily be removed by mechanical conveyors, such as screws, paddles, and the like. The salt prevents the aluminum from lumping and attaching itself to the condenser surfaces, and puts the aluminum into a form which is readily removable.

Preferably, the amount of salt passing into and collecting within the condenser surfaces is substantially larger than the amount of entrained aluminum, for example, about 20 times by weight. This ratio permits reflux without mechanical removal means, flushing the aluminum particles back into the distillation system. Alternatively, the feed of the original mixture of aluminum and mercury to be melted and distilled is charged into the distillation system by the propelling force of the reflux stream of liquid condensate. In such case, it is unnecessary to utilize mechanical removal means, which is of advantage, since it is difficult to maintain moving parts well sealed in a tightly closed system in continuous operation, wherein mercury losses and hazards must be kept to a minimum. In the latter arrangement also, the amount of refluxing salt is purposely kept larger than the amount of entrained salt droplets. A salt or mixture of salts is used for the salt bath, which will vaporize readily at about 670°–720° C., the vapors of salt being totally or substantially condensed and recycled.

The salt bath employed in accordance with the invention comprises a mixture of salt which, upon melting, will provide either a single homogeneous molten layer, or which may, by proper selection, provide a double molten layer, i.e. a pair of immiscible molten salt layers. In either case, the salts must be selected so that constituents of said salt, which become entrained in form of droplets and vapor reconstitute within the condenser a salt mixture, which remains substantially liquid at a temperature somewhat below that at which mercury condenses at the prevailing pressure. Thus, for example, the condensation temperature of mercury is 356.6° C. at 1 atmosphere, and about 420° C. at 3 atmospheres absolute.

The operating temperature of the molten salt bath will generally be above about 670° C. The practical upper limits of temperature is determined by operating pressure and energy consumption, but will generally be about 720° C. at atmopheric pressure. The salt melt is internally heated by passing an electric current therethrough by means of electrodes, the molten salt bath serving as a resistor.

Salt baths which furnish a single molten layer, will generally comprise binary salt mixtures. In accordance with the invention, binary mixtures which have been found useful are those containing at least one halide of aluminum together with at least one halide of an alkali metal, an alkaline earth metal, or both. Suitable halides of aluminum include aluminum chloride $AlCl_3$ and bromide $AlBr_3$. The alkali metal halides include the chlorides and bromides of sodium, potassium, ammonium, lithium, rubidium and caesium. Alkaline earth metal halides include the chlorides and bromides of calcium, strontium, barium and magnesium. These combinations of aluminum halides and alkali metal and alkaline earth metal halides may also be employed in the form of double salts, or mixtures of such double salts. The melting points of such double salts and mixtures thereof are shown in Table 1:

*Table 1.*

MELTING POINTS OF ALUMINUM DOUBLE SALTS (WEIGHT PERCENT)

| $NaAlCl_4$, percent | $KAlCl_4$, percent | $LiAlCl_4$, percent | Melting Point, °C. |
|---|---|---|---|
| 100 | | | 154 |
| | 100 | | 245 |
| | | 100 | 142 |
| | 35 | 65 | 120 |
| | 50 | 50 | 132 |
| 33.3 | 33.3 | 33.4 | 115 |
| 25 | 50 | 25 | 156 |
| 65 | 35 | | 135 |
| 50 | 50 | | 180 |

| $NaAlBr_4$, percent | $KAlBr_4$, percent | $LiAlBr_4$, percent | |
|---|---|---|---|
| | | 100 | 195 |
| 100 | | | 200 |
| | 100 | | 189 |

| $NH_4AlCl_4$, percent | $NH_4AlBr_4$, percent | $2 AlCl_3 \cdot MgCl_2$, percent | |
|---|---|---|---|
| 100 | | | 301 |
| | 100 | | 229 |
| | | 100 | 227 |

As will be seen from Table 1, the melting points of the listed double salts and their mixtures are suitably low. However, all of them exhibit a high vapor pressure in the temperature range 670°–720° C., as is shown for $NaAlCl_4$ in the curve of FIG. 4. At 1 atmosphere pressure and 700° C. the vapor over boiling $NaAlCl_4$ has a composition about 80 mol percent $AlCl_3$ and 20 mol percent $NaAlCl_4$. If normal atmospheric pressure is maintained in the equipment, this vapor will not of itself recombine totally to a liquid at a temperature corresponding to that of the condenser surfaces, e.g. about 200° C., although droplets of the original melt mechanically entrained into the condenser will absorb some of the $AlCl_3$ vapor. When a vapor mixture of this kind is condensed at 200° C., the mol fraction of $NaAlCl_4$ does not recombine with the total fraction of $AlCl_3$ vapor; the condensing $NaAlCl_4$ absorbs only so much $AlCl_3$ from the vapor as to attain a concentration of 20 mol percent NaCl, remainder $AlCl_3$, a mixture which melts at about 200° C. Therefore a large amount of $AlCl_3$ vapor is present in the system at all times and does not recombine to a liquid phase. There is little difference in this general behavior where the salt melt is $KAlCl_4$ except that the vapor pressure over this molten salt in the range of 670°–720° C. is somewhat lower. The double salt $LiAlCl_4$ is more advantageous in this respect since it is easier to reform a liquid phase from the vapors; a melt below 200° C. may be formed containing only 6.6 mol percent LiCl, balance $AlCl_3$. Furthermore, an original melt containing 2 mols $AlCl_3$ and 1 mol $MgCl_2$ condenses to a liquid with only 9.9 mol percent $MgCl_2$ at a temperature below 200° C.

In the corresponding salt mixtures of $AlBr_3$ and bromides of alkali metals or alkaline earth metals (including magnesium), the vapors condense more readily to liquids at temperatures lower than for the corresponding chlorides and with a lower mol percent of constituents other than $AlBr_3$. Mixed chloride and bromide systems may also be employed. Phase relationships or mixtures of $AlCl_3$ and $AlBr_3$, respectively with other salts, are to be found set forth in the article by James Kendall et al., J.A.C.S., April 1924, pages 968 et seq. Although functionally the bromides offer advantages of easier handling, their use will be determined by economic considerations. The chloride mixtures permit a sufficient amount of liquid salt to be reformed by condensation from the vapor phase and from the entrained droplets within the condenser to achieve the objectives of the invention.

In accordance with a preferred form of the invention, there are employed salt mixtures which form two immiscible molten layers at temperatures above about 670° C. This provides the advantage of maintaining an easily vaporizing molten salt layer on top, and a much less vaporizable layer on the bottom of the two layer system. The proportion of these layers is not critical, but advantageously, the upper layer, which is rich in $AlCl_3$ or $AlBr_3$, will comprise about 10% to about 15% of the total amount of the molten salt bath. The upper layer contains enough $AlCl_3$ or $AlBr_3$ to offer easy vaporization, while the underlying layer containing the remaining $AlCl_3$ or $AlBr_3$ develops little vapor pressure at the prevailing temperature and serves to provide sufficient depth for the electrical resistance required for heating of the bath.

Salt mixtures which form double layers as described will be ternary or more complex systems, but may contain more components. Suitable mixtures are among those described in Grothe et al., Zeitschrift fuer Elektrochemie, vol. 54, No. 3, May 1950, pages 214–215, and in German Patent 829,504 (1952).

Typical salt mixtures which form immiscible molten layers at temperatures above about 670° C. are shown in Table 2, below, and in FIG. 5 of the drawings.

*Table 2*

DOUBLE LAYER FORMING SALT MIXTURES (WEIGHT PERCENT)

| $AlCl_3$ | LiCl | KCl | NaCl | $MgCl_2$ | Temperature, °C.[1] |
|---|---|---|---|---|---|
| 15.0 | | 45.0 | 40.0 | | 700 |
| 23.2 | | 42.6 | | 34.2 | 700 |
| 40.0 | | 39.5 | 20.5 | | 670 |
| 13.86 | 56.3 | 11.42 | | 18.42 | 700 |
| 47.77 | 23.76 | 28.97 | | | 775 |
| 28.24 | 37.90 | 33.86 | | | 775 |

[1] Temperature below which the melt is 2-layered and not homogeneous.

It will be noted that these mixtures contain at least two halides of alkali metals or alkaline earth metals to one aluminum halide, the latter being present in amounts substantially lower than stoichiometrically required to satisfy the formation of double salts, with the total of salts other than $AlCl_3$ or $AlBr_3$. In such cases, a lower layer forms on melting, which contains relatively little $AlCl_3$ or $AlBr_3$, while the upper layer consists mainly of double salts, and is more volatile.

An advantage of such a double layer melt is that droplets entrained from the lower layer carry more alkali metal or alkaline earth metal halides into the condenser, these halides themselves having high melting points, but absorbing within the condenser Al halides from the vapor, forming the low melting double salts, which readily flow back to the distillation system.

In some salt mixtures, immiscible layers disappear and there are formed homogeneous melts at certain critical higher temperature ranges. Hence in utilizing such mixtures, operation above such critical temperatures should be avoided.

FIG. 5 illustrates the phase diagram of a preferred ternary mixture of $AlCl_3$—KCl—LiCl in the range of 670°–730° C. Field IV in the figure shows the compositions which segregate into two layers. For the purposes of the invention, the compositions laying on or near the line connecting the $AlCl_3$ corner of the diagram with point A are the most desirable. The line connects all compositions in which KCl and LiCl have a molar ratio of 41:59, which is in itself the lowest melting binary combination of the two alkali metal salts. The line to point A intersects the curve surrounding field IV at one upper and one lower point, indicating the composition of the upper layer to contain about 60% $AlCl_3$, and the composition of the lower layer to contain about 6% $AlCl_3$. By selecting a total $AlCl_3$ content of the total composite lying within the egg-shaped field IV, one can determine the relative quantities of both layers from the diagram. Thus, in a composite containing 85 mol percent KCl and LiCl combined in the aforementioned ratio, together with 15 mol percent $AlCl_3$, there will be formed on melting, a lower layer comprising 5 parts of the total composite and containing about 6% $AlCl_3$, and an upper layer comprising 1 part of the total composite and containing about 60% $AlCl_3$. In this way the upper layer is available for vaporization, but the quantity is limited to one-sixth of the total. Only this amount can cycle in the form of vapors and liquefied condensate between the distillation zone and the condensing zone. Control of the amount of vapor may be achieved by applying internal pressure sufficient to prevent too much vaporization. However, the efficiency of electric heating of the salt bath, using the salt mixture itself as the resistor, is affected if the cycle of vaporization and recondensation does not also involve close control of the amount of material being recycled. Thus, by using a relatively small amount of the upper layer, which vaporizes and recondenses, heat losses due to recycling can be held to a minimum.

It will be apparent that excess $AlCl_3$ or $AlBr_3$ can not be present in the upper layer, since this would tend to draw alkali metal or alkaline earth metal halides from the lower into the upper layer. If it is desired to have present a greater amount of volatile salts, e.g. in order to lower the melting point of the condensate, additions of an ammonium halide, such as $NH_4Cl$ or $NH_4Br$ may be made, which will be totally vaporized above 400° C., but add themselves to the liquid phase in the condenser. It is advantageous to add approximately 2–4 mol percent of $NH_4Cl$ to the ternary system previously described if a larger quantity of condensed reflux salt is desired.

Generally the same relationships exist in salt systems based on bromides or on mixtures of bromides with chlorides. The use of alkaline earth metal halides serves to shift the vapor pressure of double salts to lower values at the same temperature. The amounts must be limited however to avoid raising the temperature of the liquid phase of the condensate too high thereby necessitating disadvantageous pressures in the system.

There may also be included in the salt mixtures additions of salts reducible by aluminum, such as $MnCl_2$ or $K_2TiF_6$. These may be added if alloys of aluminum containing Mn or Ti are desired.

Furthermore, small amounts of fluoride of alkali metals or alkaline earth metals, such as up to 5% cryolite or up to 1% calcium fluoride may be added in order to aid the coalescence of the aluminum when it metls within the body of the molten salt bath, promoting the sinking of the aluminum to a pool of the metal maintained beneath the molten salt bath. In most of the compositions given in Tables 1 and 2, one or more fluorides, such as, for example, $AlF_3$, $NaF$, $KF$, $LiF$, $NH_4F$, and $CaF_2$ may be added in amounts ranging from about 0.1% to about 5% total fluoride. These fluorides are in most instances soluble up to 5% by weight at 700° C. but much less so at the melting temperatures given in the tables. Thus, in $NaAlCl_4$, the solubility of cryolite at 700° C. is in excess of 3%, while at 200° C. it is only about 0.1%. Thus, excess fluoride in the melt should be avoided since it can cause an undesired thickening effect in the condenser. Accordingly, it is advisable to limit the total of fluorides to about 0.1% to 2% by weight. Where the reflux is provided by mechanical conveyers, pasty or semiliquid conditions can be handled. This also is true of salts having ranges of solidification. Such salts must be selected to provide a phase, liquid at the condenser temperature in an amount sufficient to create a pasty condition suitable for conveyers.

The presently perfered embodiment of a suitable apparatus for performing the process of the invention is shown in FIG. 1, in schematic form. The apparatus comprises a metal shell 1, forming a closed system, which includes a melting and distilling chamber 2, a feeding and condensing chamber 3 in communication with chamber 2, and a separation and recovery chamber 4 for the aluminum also in communication with chamber 2 to permit passage of liquid aluminum from chamber 2 to chamber 4, but otherwise sealed off by baffle wall 5 to prevent passage of vapors of mercury or salt. Shell 1 is mercury-tight and may be made, for example, of welded steel, and is protected against heat loss by suitable insulation 6, such as firebrick.

Chamber 2 is adapted to contain a bath of molten salt 7 of the character previously described, which bath, depending upon the type of salt mixture employed, may also form an immiscible upper layer 8 and lower layer 9. The bath is heated electrically by immersion electrodes 10, 11 and 12, energized by current from a 3-phase source shown generally at 13. The electrodes may be, for example, graphite or other material resistant to the bath and to molten aluminum. Feeding and condensing chamber 3 is integral with and in communication with a mercury receiving vessel 14, adapted to hold a reservoir of liquid mercury 15. The vessel 14 is provided with an inlet through which there is fed a mixture of aluminum and mercury, or aluminum crystals containing mercury, as obtained from the extraction step, which floats on the surface 35 of the mercury, the movement of the mixture being facilitated by means of conveyer 17.

The condensing and feeding chamber 3 includes a wall 18 forming a hollow jacket 19 through which there may be circulated a suitable cooling liquid, for example an organic coolant, such as Dowtherm (diphenyl oxidediphenyl mixture).

Crystals of mercury-containing aluminum 20, rise to the surface of the mercury pool 15 and are transported to the melting and distillation chamber 2 and fall or slide by gravity into the molten salt bath. Conveyor 21, which may be a helical type as shown in FIG. 1, having, for example, conveyor blades extending from a central hollow shaft, also serves to remove condensed aluminum and salt from the condenser surfaces and to convey these to the aluminum-mercury crystal layer 20, to be recycled to chamber 2. Condensed mercury falls into the mercury reservoir 15.

The molten aluminum collects in a body 22 and moves into a similar body 23 of molten aluminum maintained in chamber 4, from which it is removed by siphon 24. The baffle wall 5 which separates chamber 2 and chamber 4 can be made of suitable insulating material which will not contaminate the aluminum, for example, graphite. A blanket of argon gas or other suitable inert gas may be introduced to prevent oxidation of the aluminum and to prevent surges of pressure due to uneven charging of the original aluminum-mercury feed. Chamber 4 is heated by resistance heating elements 25, which may be made, for example, of silicon carbide. Outlet 26 leads to a safety valve. The argon gas is introduced through inlet 27. Exit pipe 28 leads to a suitable condensing system, not shown.

In the modification shown schematically in FIG. 2, there is depicted a variation of the feeding and condensation system in which a paddle conveyor 30, attached to shaft 31, reciprocates so as to skim over the surface of mercury reservoir 15 upon which the aluminum-mercury crystals float, pushing the material toward and into chamber 2. The conveyor is driven by a power source, not shown. Condenser 32, provided with hollow jacket 33 for holding the cooling liquid, surrounds the conveyor. In this modification, the apparatus is provided with an additional chamber 34, connecting the condensing chamber 3 and the melting and distilling chamber 4, and permitting heat exchange between the hot mercury vapors and the incoming aluminum-mercury feed material. Condensed mercury collects on sloping wall 35 and flows to reservoir 15.

In the modification shown in FIG. 3, the condenser 32 having cooling liquid jacket 33, is retained, and condensed mercury collects on sloping wall 35 and flows into mercury reservoir 15. In the modification of FIG. 3, the system relies entirely upon the reflux of stream of molten salt from the condenser 32, for transporting the aluminum-mercury crystals 20 floating upon the surface 36 of the mercury reservoir 15 into melting and distilling chamber 2. The apparatus is provided with a weir 40, positioned above and extending into the mercury reservoir 15 at the edge of the reservoir vessel nearest the condenser. The lower edge of the weir 40 is spaced apart from the sloping edge 35 to permit the passage of condensed mercury to mercury reservoir 15. The liquid salt together with entrained aluminum collects in space 41 above the sloping wall 35 in which the condensed mercury settles out and is trapped by gravity separation while the overflow entrains a fresh feed of mercury-containing aluminum crystals, transporting the mass toward the melting and distilling chamber 2, thus avoiding the necessity for a mechanical conveyer.

The operation of the apparatus and the performance of the process of the invention will be better understood with reference to the following description, which also serves as an example.

Utilizing the apparatus embodiment shown in FIG. 1, the melting and distilling chamber 2 is charged with a salt mixture of the type forming two immiscible layers upon melting. The salt mixture employed is, for example, one containing 12 mol percent of $AlCl_3$, and 88 mol percent of a mixture having a mol ratio of 41 KCl to 59 LiCl. A cryolite addition of 0.2% by weight of the mixture is included. The mixture melts to form two immiscible layers in a ratio of 8:1, the larger quantity being represented by the lower layer containing about 6% $AlCl_3$. The melting point of the lower layer is about 350° C. The upper layer, with approximately 59% $AlCl_3$, vaporizes at 670°–720° C. and condenses to a liquid having a melting point below 220° C. at a pressure of about 1.1 atmospheres maintained in the apparatus. Coolant is circulated through the condenser jacket 19, at a temperaure of about 220° C. At the beginning of operations, the entire system is flushed by a stream of an inert gas, such as argon. A heel of about 800 kg. of aluminum metal, sufficient to fill the sump of chamber 2 and chamber 4, is melted externally and filled into the system through siphon 24. About 300 kg. of salt mixture are melted externally to the apparatus and introduced into chamber 2 by any suitable means, as by a siphon, not shown, reaching into the space beneath the surface of the mercury 35, the mercury reservoir 14 having been previously filled to the required level. The molten salt contacts electrodes 10, 11 and 12, carrying 3-phase current, which supply the energy for melting the aluminum crystals and for distillation of the mercury. The mercury surface 35 is maintained at about 220° C., and crystals of aluminum-mercury from an extraction operation are introduced into the mercury reservoir through inlet 16. These rise to the surface 35, and are moved by conveyor 21 toward the sloping edge 22 of the melting chamber 2, falling into the molten salt bath. The crystals gradually melt in the bath, and the molten aluminum is removed by siphon 24. The temperature of the melting chamber 2 is maintained at about 700° C. or just above the melting point of aluminum. At this temperature, the aluminum will lose substantially all of the mercury by distillation, but will still retain about 0.01% mercury. For the removal of this residual amount, the molten aluminum is superheated in chamber 4 by heat from resistor elements 25, at a temperature of about 850° C. in order to reduce the mercury content to below 0.001%, the aluminum pool in chamber 4 having shallow depth and large surface. The argon blanket above the aluminum pool in chamber 4 controls oxidation and prevents surges of pressure. A mixture of mercury vapor and salt particles rises from the surface of the molten salt bath and is condensed on the surface 18 of the condenser. The condensed mercury flows downward into mercury reservoir 15, and is thus recovered for reuse in the original extraction process. Condensed aluminum particles and salt entrained with the mercury vapor collect on the condenser surface and are removed therefrom and returned to the molten salt bath in admixture with the aluminum-mercury crystals by means of conveyor 21. Salt losses are replenished as needed.

In the apparatus in FIG. 3, there may advantageously be employed a salt mixture containing, by weight, 25% $NaAlCl_4$, 48% $KAlCl_4$, 25% $LiAlCl_4$, and 2% $NH_4Cl$. The temperatre in the condenser and at the mercury surface is maintained at 200° C., while the pressure in the system is 1.3 atmospheres absolute.

In all forms of the invention exemplified by FIGURES 1, 2 and 3, the cooling by an external fluid may be accomplished wholly or in part by introducing liquid mercury, having a temperature substantially lower than its boiling point, preferably ambient temperature, from an external source into the condensing chamber so that the hot vapors contact cold mercury. About 15 parts by weight of cold liquid mercury at 20° C. are necessary to absorb the latent and tangible heat of 1 part mercury vapor from the distillation chamber at 700° C. by heat exchange, forming a liquid mixture of 16 parts Hg at 220° C. Excess mercury accumulated in column 15 is siphoned off by means not shown in FIG. 1.

In a continuous system in which impure Al alloys are purified by mercury extraction, it is necessary to withdraw a part of the mercury in each cycle and purify it from small, often sub-micron sized, impurities of suspended particles of substances like Fe, Ti, Si. After cleaning, this mercury is put back into the system. It is advantageous to use this mercury for internal cooling within the condenser chamber.

Internal cooling is an additional safeguard against undesired build-up of aluminum on the condenser surfaces. Though most of the entrained aluminum will reach said surfaces as solid particles, occasional liquid splashes cannot be totally excluded due to the dynamic turbulence which may occur in chamber 2. Internal cooling by a shower of cold liquid mercury droplets, preferably placed atop of the mercury level 35, is an excellent means of chilling the entrained aluminum particles to a temperature below their melting point.

What is claimed is:

1. Process for the separation and recovery of aluminum and mercury from a mixture of aluminum crystals and mercury containing more than about 50% by weight of aluminum which comprises melting the aluminum and vaporizing the mercury by introducing said aluminum-mercury mixture into a molten bath of a salt mixture including at least one halide of aluminum, and at least one member selected from the group consisting of a halide of an alkali metal and a halide of an alkaline earth metal, the body of said bath being maintained at an average temperature above about 670° C., said bath having a melting temperature range providing a substantial amount of liquid phase at a temperature below the temperature of condensation of mercury vapor at the prevailing pressure, separating the aluminum from the molten salt bath and recovering the aluminum, and condensing and recovering the mercury.

2. The process of claim 1 in which the pressure in the system is maintained at about 1.1 atmospheres absolute.

3. The process of claim 1 in which the molten salt bath is heated by immersion electric heating.

4. The process of claim 1 in which the mercury-containing aluminum comprises aluminum crystals containing between about 30% and about 50% mercury obtained by the extraction of an aluminum metal containing material with liquid mercury.

5. The process of claim 1 in which the molten salt bath comprises a single homogeneous molten layer.

6. The process of claim 1 in which the molten salt bath comprises two immiscible molten salt layers.

7. The process of claim 1 in which the halide of aluminum is aluminum chloride.

8. The process of claim 1 in which the salt bath includes from about 0.1% to about 5.0% by weight of a metal fluoride.

9. The process of claim 1 in which the salt bath includes a mixture of aluminum chloride, potassium chloride and lithium chloride forming two immiscible molten layers in the temperature range 670°–720° C.

10. The process of claim 1 in which the molten salt bath comprises two immiscible molten salt layers in the temperature range 670°–720° C., the upper layer being substantially richer in aluminum halide content than the lower layer.

11. The process of claim 1 in which the salt mixture contains, by weight, 25% $NaAlCl_4$, 48% $KAlCl_4$, 25% $LiAlCl_4$, and 2% $NH_4Cl$.

12. The process of claim 9 in which the salt mixture contains 12 mol percent of $AlCl_3$ and 88 mol percent of a mixture having a mol ratio of 41 KCl to 59 LiCl.

13. Process for the separation and recovery of aluminum and mercury from a mixture of aluminum crystals and mercury containing more than about 50% by weight of aluminum which comprises melting the aluminum and vaporizing the mercury by introducing said aluminum-mercury mixture into the lower portion of a body of liquid mercury heated to a temperature at least about 220° C., allowing the aluminum-mercury mixture to rise by buoyancy through said liquid mercury body, then introducing the preheated aluminum-mercury mixture into a molten bath of a salt mixture including at least one halide of aluminum, and at least one member selected from the group consisting of a halide of an alkali metal and a halide of an alkaline earth metal, the body of said bath being maintained at an average temperature above about 670° C., said bath having a melting temperature range providing a substantial amount of liquid phase at a temperature below the temperature of condensation of mercury vapor at the prevailing pressure, said mercury vapor containing entrained particles of finely divided aluminum and salt bath ingredients, cooling and condensing said mercury vapor to separate liquid mercury from said entrained particles, returning said entrained particles continuously to said molten salt bath, and separating the aluminum from the molten salt bath and recovering the aluminum.

14. The process of claim 13 in which the feed of mercury-containing aluminum crystals is first introduced into the returning stream of condensed aluminum and salt bath particles and transported to the molten salt bath by the action of said stream.

15. The process of claim 13 in which the ratio of entrained salt bath particles to the entrained finely divided aluminum is about 20 to 1.

16. In apparatus for the separation and recovery of aluminum and mercury from a mixture of aluminum and mercury containing more than about 50% by weight of aluminum in a system employing a molten salt bath: the improvement, comprising a chamber for containing a molten salt bath and for melting aluminum and vaporizing mercury, said chamber benig provided with means for heating the contents thereof by immersion into the body of the salt bath, conveyor means for feeding aluminum-mercury mixture to said chamber, means for condensing mercury vapor comprising a chamber in communication with said melting and vaporizing chamber having a hollow jacket providing a condenser in at least one wall thereof, and means in communication with said melting and vaporizing chamber comprising a chamber for separating and recovering molten aluminum.

17. The apparatus of claim 16 in which the melting chamber includes a sloping side wall to permit accumulation of molten aluminum at the bottom of the chamber.

18. The apparatus of claim 16 which includes a baffle wall located between the melting chamber and the aluminum heating and recovery chamber extending downwardly into the molten aluminum to prevent passage of mercury vapors.

19. The apparatus of claim 16 in which the conveyor is a reciprocating type conveyor.

References Cited by the Examiner

UNITED STATES PATENTS

| | | | |
|---|---|---|---|
| 1,628,012 | 5/1927 | Tracy | 75—81 |
| 1,631,544 | 6/1927 | Miner | 75—67 |
| 1,819,238 | 8/1931 | Greene | 75—10 |
| 2,108,034 | 2/1938 | Eppensteiner | 75—63 |
| 2,238,792 | 4/1941 | Hanawalt et al. | |
| 2,268,779 | 1/1942 | Seifert | 75—67 |
| 2,330,487 | 9/1943 | Grace | 75—10 X |
| 2,348,673 | 5/1944 | Degner | 75—81 X |
| 2,457,552 | 12/1948 | Handwerk et al. | |
| 2,758,023 | 8/1956 | Bareis | 75—63 X |
| 2,795,498 | 6/1957 | Messner | 75—81 X |

FOREIGN PATENTS

| | | |
|---|---|---|
| 226,217 | 1/1960 | Australia. |

DAVID L. RECK, *Primary Examiner.*

BENJAMIN HENKIN, *Examiner.*